Nov. 25, 1952 G. JAY 2,619,028
WIRE APPLYING DEVICE FOR HAY BALING MACHINES
Filed Oct. 8, 1948 5 Sheets-Sheet 4

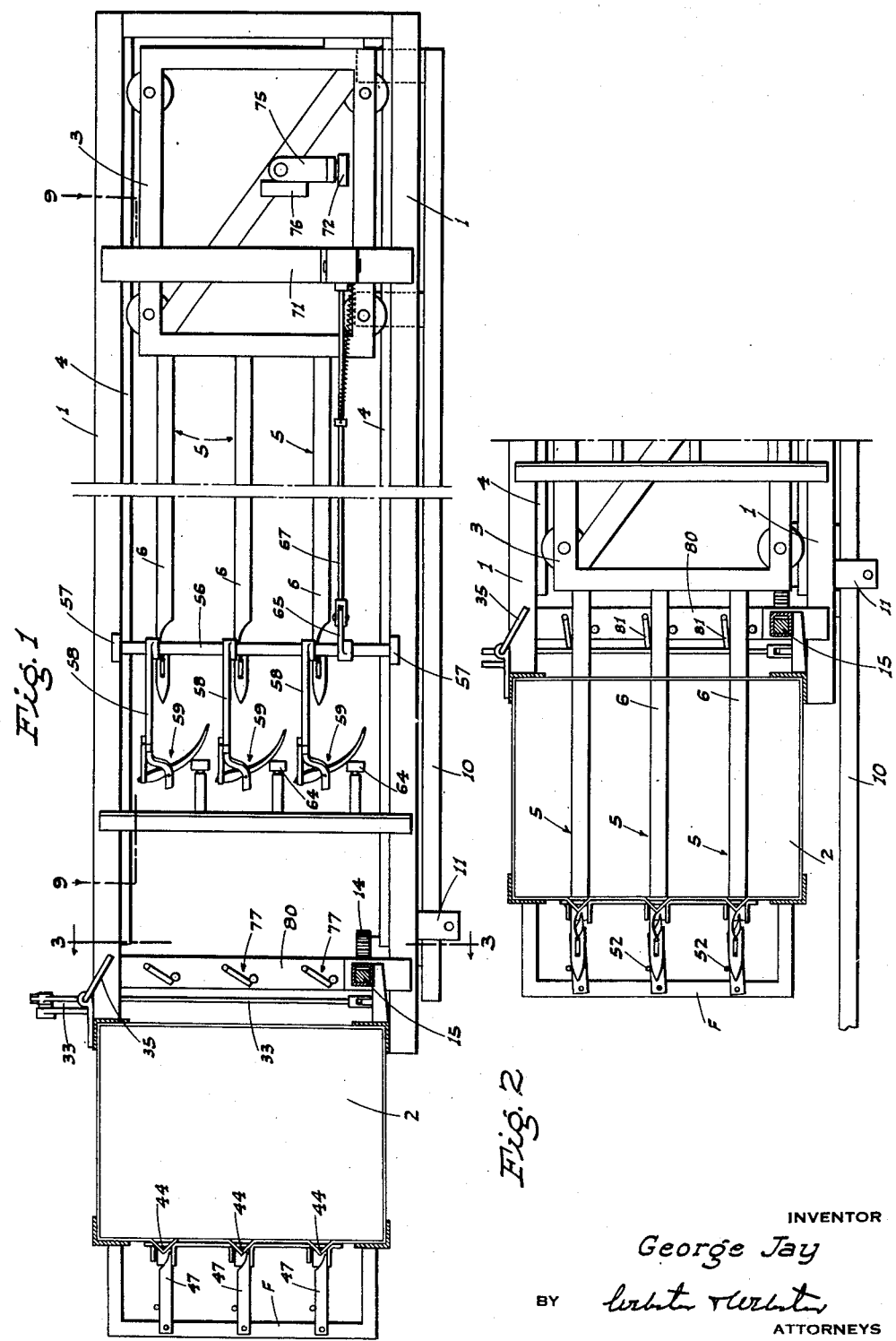

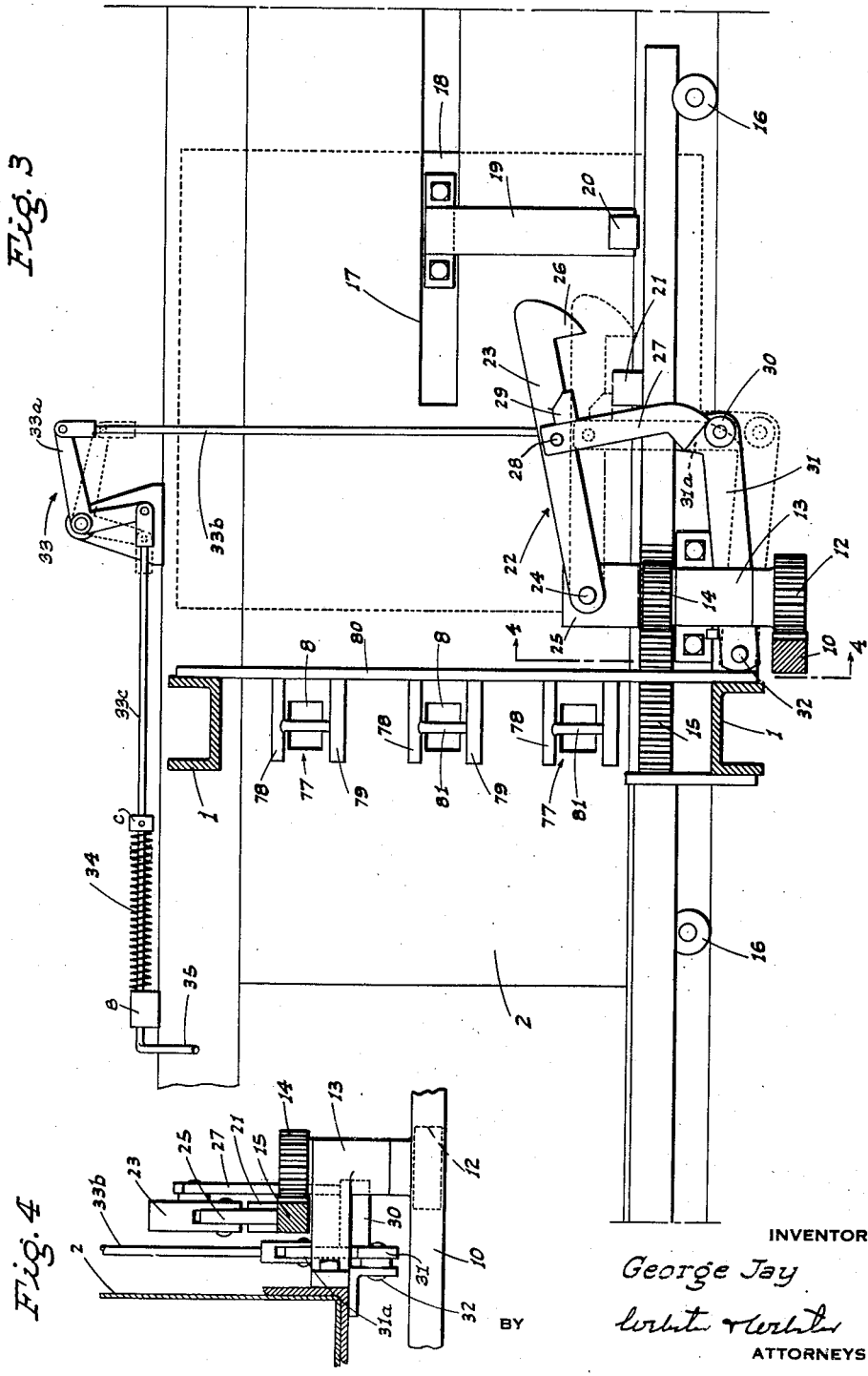

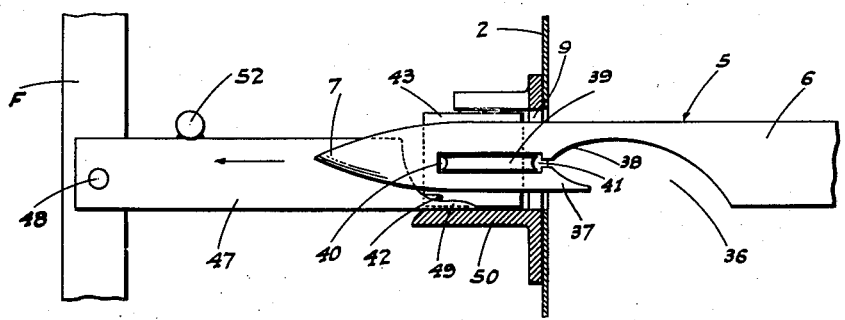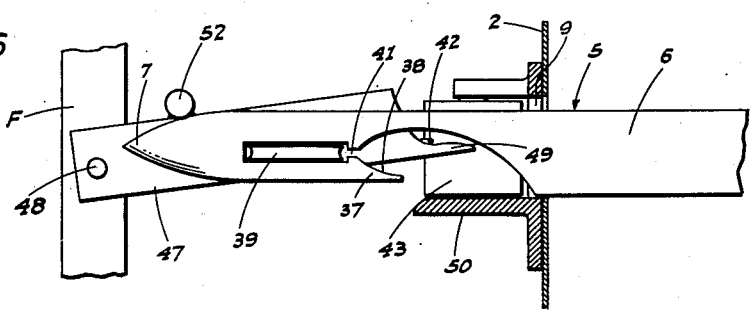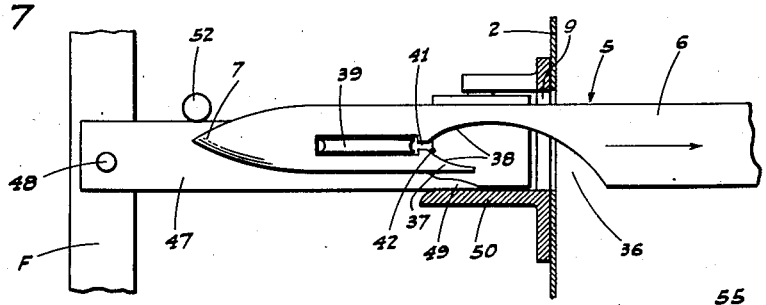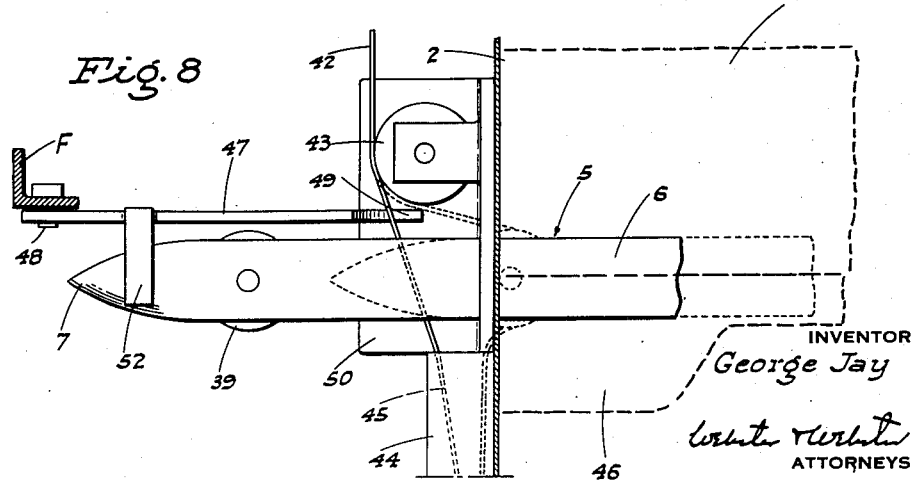

INVENTOR
George Jay
BY
ATTORNEYS

Nov. 25, 1952             G. JAY             2,619,028
WIRE APPLYING DEVICE FOR HAY BALING MACHINES
Filed Oct. 8, 1948             5 Sheets-Sheet 5
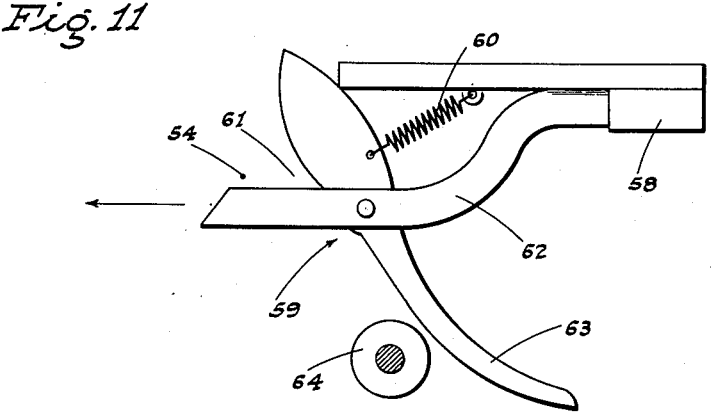
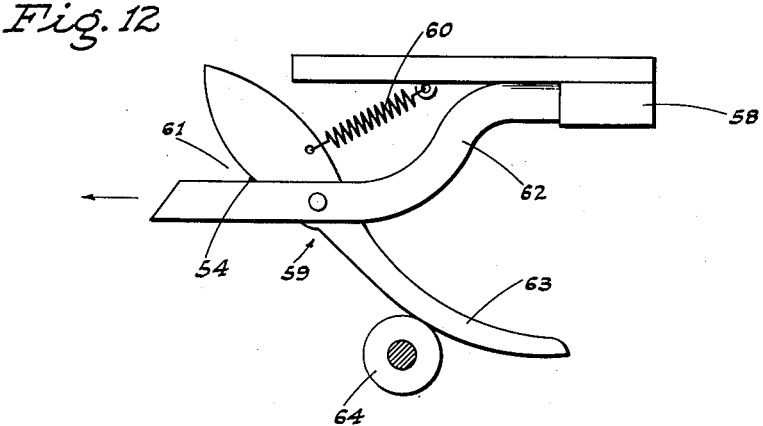
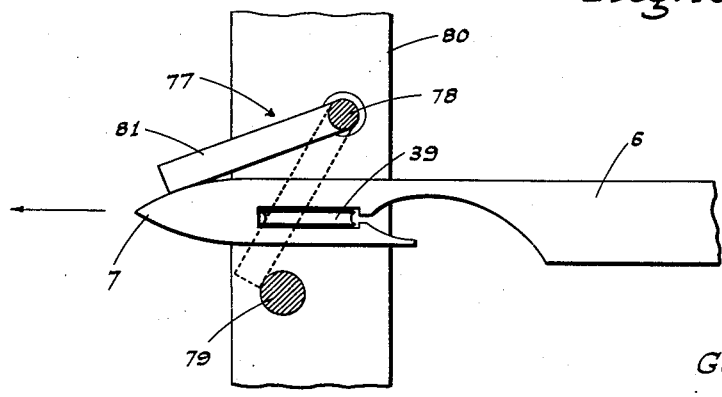
INVENTOR
George Jay
BY
ATTORNEYS Patented Nov. 25, 1952

2,619,028

UNITED STATES PATENT OFFICE 2,619,028

WIRE APPLYING DEVICE FOR HAY BALING MACHINES

George Jay, Lathrop, Calif., assignor, by mesne assignments, of one-fourth to C. H. Harmon, Stockton, and one-fourth to Marvin Frisk, Linden, Calif.

Application October 8, 1948, Serial No. 53,572

5 Claims. (Cl. 100—19)

This invention relates to, and it is an object to provide, a semi-automatic wire applying device for hay baling machines; the purpose of the device being to mechanically feed vertically spaced wires through the baling chamber for subsequent manual tying.

In many conventional hay baling machines the wires are fed, by one man, from one side of the baling chamber through slots or grooves in blocks which separate the bales; the wires being tied by another man on the opposite side of the baling chamber.

In particular the present invention contemplates, as another of its objects, the automatic feeding of the wires from said one side of the baling chamber to the opposite side; thus eliminating the need of a man to manually perform this operation.

As another object, the invention provides a novel feeding mechanism operative to feed each wire double through the baling chamber from said one side to the opposite side, with the loop exteriorly of the latter; there being a novel wire cutting unit operative, in timed relation, to sever the wire adjacent the loop so that one run of each wire may be tied about a corresponding lead bale and the other run remain for tying, subsequently, about the next following bale.

An additional object of the invention is to provide a wire applying device which is operative to feed the wires, as above, at a speed greater than can be accomplished by hand, and to permit faster hand tying thereof, whereby the output of the baling machine is increased.

A further object of the invention is to provide a wire applying device, which avoids the need of using slotted or grooved blocks to space adjacent bales for wire passage; the wires, in the present instance, being fed directly through the compressed hay at the point at which adjacent bales are to separate.

It is also an object of the invention to provide a wire applying device which is designed for ready and convenient attachment to conventional, and existing, hay baling machines.

A further object of the invention is to provide a practical and reliable wire applying device, and one which will be exceedingly effective for the purpose for which it is designed.

These objects are accomplished by means of such structure and relative arrangement of parts as will fully appear by a perusal of the following specification and claims.

In the drawings:

Fig. 1 is an elevation of the device as mounted on a hay bailing machine and with the wire feeding mechanism retracted; the view looking forward.

Fig. 2 is a fragmentary elevation, as above, but with the needles fully advanced.

Fig. 3 is an enlarged, fragmentary, transverse section of the device taken on line 3—3 of Fig. 1.

Fig. 4 is a cross section on line 4—4 of Fig. 3.

Fig. 5 is an enlarged, fragmentary elevation of one needle, and cooperating parts, at the beginning of a wire pick-up operation.

Fig. 6 is a similar view, but shows the next step in operation; i. e., elevation of the wire preparatory to threading to the grooved pulley of said needle.

Fig. 7 is also a similar view, but shows a subsequent step in the operation; i. e. the wire being threaded but just short of the grooved pulley.

Fig. 8 is an enlarged, fragmentary plan of one needle and the cooperating parts in positions corresponding generally, in full lines, to Fig. 6.

Fig. 11 is an enlarged fragmentary side elevation of one of the shears short of the actuating roller.

Fig. 12 is a similar view but shows the shear in engagement with the actuating roller.

Fig. 13 is a fragmentary sectional elevation of one of the wire separating finger units.

Figure 9:
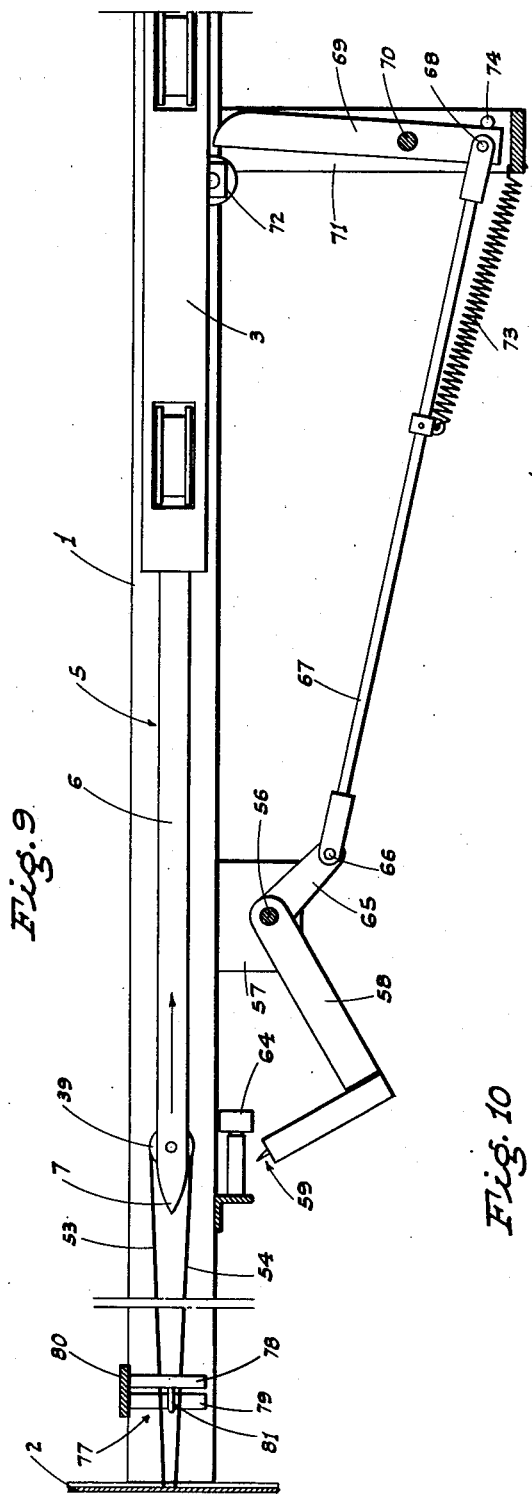
Fig. 9 is an enlarged, fragmentary sectional plan on line 9—9 of Fig. 1 showing the shear actuating mechanism in normal, non-working position.
Figure 10:
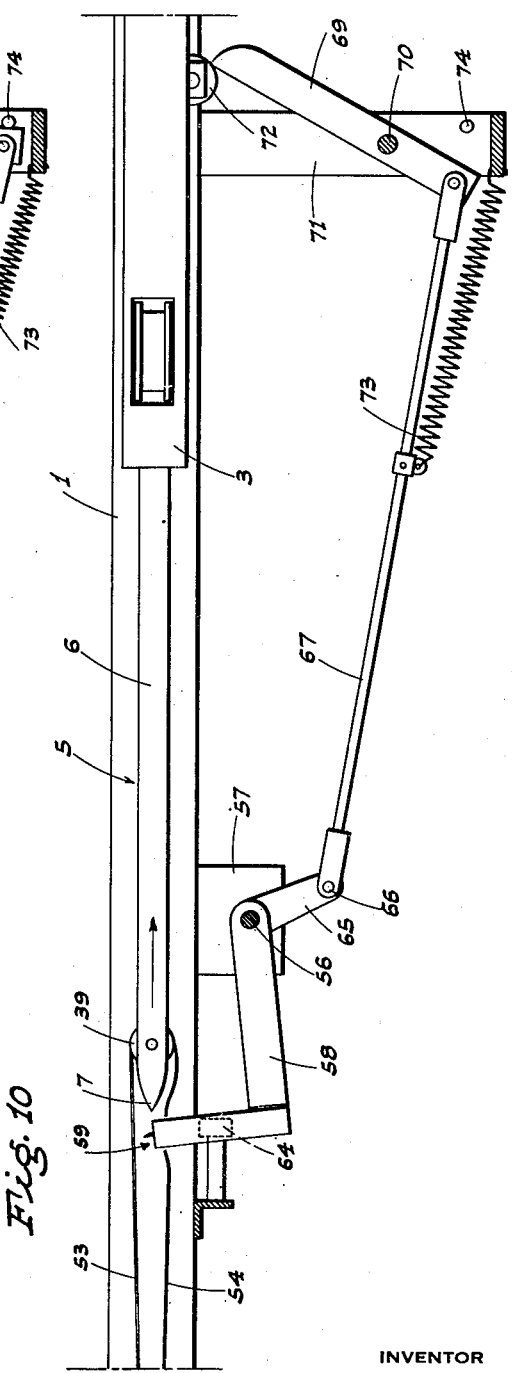
Fig. 10 is a similar view, but shows the shear actuating mechanism in working position.

Referring now more particularly to the characters of reference on the drawings, the novel wire applying device for hay baling machines comprises an elongated, laterally projecting frame 1 fixed, at its inner end, in connection with the baling chamber 2 of a generally conventional hay baling machine; the frame 1 being disposed at a point adjacent, but short of, the discharge end of said baling chamber 2.

The frame 1, which is disposed vertically, and open horizontally, carries therein a roller-mounted carriage 3, which runs on upper and lower rails 4; the carriage 3 normally being in a retracted position at the outer end of the frame 1, as in Fig. 1.

A plurality of rigid, vertically spaced needles 5, here three in number, are secured to, and project inwardly from, the carriage 3 at right angles to the baling chamber 2. Each needle 5 includes an elongated shank 6 having a point 7 on its free end.

Upon each reciprocation of the carriage 3, the needles 5 first advance and project through the baling chamber 2 and then retract and withdraw from such chamber; the latter having matching openings 8 and 9 in opposite sides thereof for passage of the corresponding needle 5.

Reciprocation of the carriage 3 is accomplished through the medium of the following mechanism:

A horizontal, laterally extending rack 10 is disposed below the frame 1, and at its outer end said rack is fixed in connection with the carriage 3. Adjacent its inner end the rack 10 runs through a guide 11. A vertical-axis pinion 12 meshes with the rack 10 adjacent the guide 11; the pinion shaft (not shown) extends upwardly through a journal 13, and carries another vertical-axis pinion 14 above said journal.

The pinion 14 runs in mesh with a horizontal, longitudinally extending rack 15 mounted in slidable and guided relation along the adjacent side of the baling chamber 2 near the bottom of the latter. The mounting means for the rack 15 includes rollers 16.

The adjacent side of the baling chamber 2, at a point ahead of the assembly of pinions 12 and 14, is formed with a longitudinal slot 17 which exposes the follower or plunger 18 of the hay baling machine. A leg 19 is affixed, at its upper end, to the exposed part of the follower 18, and thence depends outside of the baling chamber 2 directly above the rack 15; there being a laterally outwardly projecting boss 20 on the lower end of said leg 19. An upstanding block 21 is mounted on the rack 15 in the path of the boss 20, whereby—when the follower 18 is in its fully advanced position—boss 20, pushing against the block 21, similarly advances the rack 15. This motion of the rack 15, as transmitted by pinions 12 and 14 to the rack 10, runs the latter, and the carriage 3, to its fully retracted position. This is the normal position of the rack 10 and said carriage 3.

When it is desired to cause one reciprocation of the carriage 3 and the needles 5, for the wire applying operation hereinafter described, a latch unit, indicated generally at 22, is brought into play, which latch unit is constructed as follows:

A longitudinally extending latch 23 is pivoted, at its rear end, as at 24, to an upstanding ear 25 on the rack 15 at a point rearward of the block 21; such latch normally extending at an upward and forward incline, as in full lines in Fig. 3, to a point above and ahead of said block 21; there being a depending hook 26 on the free end of said latch 23. The latch 23 is normally maintained in the above described position by means of a depending trigger 27 pivoted, at its upper end, as at 28, to the latch 23 intermediate its ends; the trigger 27 bearing forwardly against a stop 29. At its lower end the trigger 27 normally seats on a roller 30 at the elbow of an L-shaped arm 31 including a lower, rearwardly projecting leg, and a forward, upwardly projecting leg 31a. The lower leg is pivoted at its rear end, as at 32, for vertical swinging of the arm 31; said L-shaped arm 31 normally being maintained in its raised position, as in full lines in Fig. 3, by a control linkage 33. Linkage 33 includes a bell crank 33a pivoted on top of the baling chamber, a depending link rod 33b connecting one leg of the bell crank and the leg 31a of arm 31, and a horizontal rearwardly projecting link rod 33c connected to the other arm of the bell crank and slidably extending through a fixed block B on the baling chamber. A compression spring 34 on the rod 33c extends between block B and a collar C on said rod and acts on the linkage to pull up on rod 33b and maintain arm 31 normally raised. Rod 33c at its rear end is provided with a handle 35, by means of which the linkage may be actuated to lower the arm 31 to its dotted line position of Fig. 3.

Upon actuation of the control linkage 33 and lowering of the arm 31, the latch 23 drops to its dotted line position of said figure, so that upon the next full advance of the follower 18, the boss 20 snaps under the hook 26 and is engaged by the latter, whereby said boss 20 and the block 21 are locked together in adjacent, substantially abutting relation. Thereafter, with the next reciprocation of the follower 18, beginning with its back stroke, the rack 15 travels with said follower. The result is that the assembly of pinions 14 and 12 correspondingly reciprocate the rack 10 and carriage 3 first with an advancing stroke, followed by a retracting stroke.

It will thus be seen that by reason of the above arrangement, retraction of the follower 18 occurs at the time that the carriage 3 and needles 5 are advanced, whereas said carriage and needles retract as the follower 18 advances. Consequently, there can never be any accidental engagement of the follower 18 with the needles 5 while the latter are projected through the baling chamber 2.

When the follower 18 reaches its fully advanced position, the depending trigger 27 engages and rides onto the roller 30 of the L-shaped arm 31; the latter having been returned to raised position by the spring 34. When the trigger 27 rides onto the roller 30, the latch 23 is raised to its normal non-working position, so that thereafter the follower 18 may reciprocate without causing any motion of the rack 10 and the parts actuated thereby. In short, the operator causes the latch 23 to fall into working position, but it is automatically reset to a non-working position after one reciprocation of the follower 18. This is necessary for the reason that the wire applying device is placed in operation only once for a number of reciprocations of the follower 18.

As each needle 5, including its point 7, and the cooperating mechanism on the side of the baling chamber 2 opposite the frame 1, is identical in construction and function, a description of one will suffice for all.

Each shank 6 is of such length that when the carriage 3 is fully advanced, the corresponding needle point 7 is projected beyond the opposite side of the baling chamber 2, to there pick up a baling wire in the manner hereinafter described.

Each needle point 7 is formed with a downwardly opening throat 36, which is open to opposite sides of said point; there being a rearwardly projecting hook 37 at the forward and bottom portion of said throat 36. The edges of the throat 36 converge forwardly, as at 38, above the hook 37. A grooved pulley 39 is mounted on a vertical axis in a transverse slot 40 through the point 7 ahead of the throat 36; said slot 40 opening, at its rear end, as at 41, to communication with the forward portion of said throat 36.

A baling wire 42 extends from a feed spool (not shown) rearwardly along the side of the baling chamber 2 opposite the frame 1, and directly ahead of the corresponding opening 9 runs on a vertical-axis guide roller 43. The wire initially extends across the opening 9 and runs rearwardly through an inwardly opening corresponding longitudinal channel 44 in the adjacent side of the baling chamber 2, as at 45. The wire in each channel 44 extends alongside of what may be termed the lead bale 46, turns about the advanced end of the latter, and extends to the opposite side of the machine for tying.

A laterally projecting frame F is generally alined with the openings 9, and a wire lift arm 47 is pivoted, as at 48, to the frame F in corresponding relation, and directly out from each opening 9. From the pivot 48, each wire lift arm 47 extends laterally inwardly, and at its inner end such wire lift arm 47 includes, at the bottom, a wire lift finger 49 which projects inwardly and rests on a stop flange 50. Each wire 42 normally extends from the roller 43 in supported relation across the corresponding wire lift finger 49.

As each needle point 7 projects through the baling chamber 2, and begins to travel through the corresponding opening 9, said point passes over the wire 42 supported on the wire lift finger 49 of the corresponding wire lift arm 47, as in Fig. 5. With continued travel of said needle point to its maximum point of advance, as in Fig. 6, the lead end of said point, whose upper surface is a cam 51, engages below a transverse pin 52 on the arm 47 intermediate its ends, swinging said arm upwardly, as in Fig. 6. This causes the finger 49 to lift the wire 42 into the throat 36, so that when the point 7 begins to retract, as in Fig. 7, the wire is caught by the rearwardly projecting hook 37, and is thence guided by the converging edges 38 through the slot opening 41 onto the grooved pulley 39.

With further retraction of each point 7 the corresponding wire 42 is pulled double through the openings 9, across the baling chamber 2, through its opposite side, and to a considerable extent therebeyond; the separate runs of the wire being indicated at 53 and 54, with the end loop engaged about the pulley 39. The carriage 3 and the needles 5 are caused to reciprocate once, in the manner previously described, whenever the operator determines that the lead bale 46 is of a predetermined length ahead of the transverse working plane of said needles 5. With such reciprocation of the needles 5, the three corresponding wires 42 are picked up and pulled double, as above, through the compressed hay at the intended point of division between the lead bale 46 and the next following bale 55.

After the three wires have each been pulled double through and beyond the baling chamber 2 by full retraction of the needles 5, each wire is cut adjacent the roller 43 to separate the runs 53 and 54. This cutting of each wire is accomplished by shears, and shear actuating mechanism, hereinafter described in detail.

With progression of compressed hay in the baling chamber 2, whereby each following bale 55 ultimately assumes the position of, and becomes, the lead bale 46, the three baling wires extend about the lead bale 46 with a run 54 at the advanced end and a run 53 at the trailing end. An operator, disposed on the same side of the machine as the frame 1, but rearwardly thereof, manually picks up the runs 53 and 54 of each wire extending about the lead bale 46, and ties or twists said runs together.

As each following bale 55 progresses to the position of, and becomes, the lead bale 46, each wire 42 is pulled across the corresponding opening 9 on top of the adjacent wire lift finger 49, and travels with the bale, as at 45, in the longitudinal channels 44; each wire thus again being ready for pick up by the corresponding needle 7 when the lead bale 46 reaches a predetermined length.

The handle 35 of the control linkage 33 may be disposed so that it can be manipulated by the wire tying operator, as he is in a position to readily view the extent of progression of the lead bale 46.

The arrangement of shears, and shear actuating mechanism is as follows:

A vertical shaft 56 is journaled between ears 57 which project laterally from the main frame 1 intermediate its ends, and arms 58, corresponding to and disposed in generally the same plane as the needles 5, are fixed to the shaft 56. The arms 58 project from the shaft 56 inwardly and rearwardly, and each arm carries, at its free end, a pair of laterally, inwardly extending, scissor-like shears 59 which face generally toward the frame 1; each such pair of shears being held by a spring 60, with the throat 61 normally open. One leg 62 of each pair of shears 59 is affixed to the corresponding arm 58, while the other leg 63 depends for actuation, as will hereinafter appear.

The pairs of shears 59, as mounted in connection with the arms 58, swing laterally inwardly, simultaneously, upon rotation of the shaft 56 in a corresponding direction. The disposition of said pairs of shears when swung laterally inwardly to a maximum extent is such that the corresponding run of wire 54 is within the throat 61 for cutting, but the adjacent run of wire 53 is clear of the shears.

Fig. 11 illustrates one pair of the shears as approaching the corresponding run of wire 54, while Fig. 12 illustrates said run of wire 54 in the shear throat 61 ready to be cut. As each pair of shears approaches its maximum point of laterally inward motion, upon rotation of the vertical shaft 56, the lower leg 63 of said pair of shears strikes an actuating roller 64 which swings said leg upwardly, causing said shears to cut the corresponding run of wire 54.

The vertical shaft 56 is rotated in the necessary direction to swing the shears 59 laterally inwardly, as above, by means responsive to return of the carriage 3 to its fully retracted position; such means comprising the following:

A radial lever 65 extends from the vertical shaft 56 in a rearward and outward direction, and is pivotally connected, as at 66, to a rod 67 which leads outwardly therefrom. The opposite end of the rod 67 is pivotally connected, as at 68, to the outer end of a horizontal swing lever 69 pivoted, intermediate its ends, as at 70, to a support 71 which projects laterally from the main frame 1. The inner end of the swing lever 69 is in the path of a roller 72 mounted on the carriage 3. When said carriage approaches, but is short of, its fully retracted position, the roller 72 strikes the inner end of the swing lever 69 and urges it in a direction to shift the rod 67 toward the baling chamber 2. This results in rotation of the vertical shaft 56 in the direction necessary to cause operation of the shears 59.

A spring 73 normally pulls outwardly on the rod 67 so that the lever 69 bears against a stop 74, with the inner end of said lever 69 in the path of the roller 72. The roller 72 rides over the lever 69 upon advance of the carriage 3, by reason of the fact that said roller is carried on a depending, pivotally mounted lever 75 which may swing rearwardly with respect to a stop 76. Thus, as the carriage 3 advances, the roller 72 merely passes over the lever 69, but upon retraction of the carriage there is roller actuation of said lever, in the manner previously described.

In order to assure that the runs 53 and 54 of each wire are maintained in proper separated relation when severed, there is a wire separating finger unit, indicated generally at 77, which cooperates with each double fed wire as it is pulled beyond the baling chamber 2 by the corresponding needle 5. Each wire separating finger unit 77 includes vertically spaced rods 78 and 79 which extend between transversely spaced, vertical members 80 of the frame 1; each pair of rods 78 and 79 being disposed and spaced so that the corresponding needle 5 may pass therebetween.

A radial finger 81 depends from each top rod 78 centrally of the ends of the latter, and as each rod 78 is rotatable, the finger 81 is free to swing. Thus, as each needle 5 advances, the finger 81 rides the top of the needle, but when each needle retracts, said finger 81 falls downward against the bottom rod 79 and between the runs 53 and 54 to effectively maintain them separated upon cutting of the wire.

With the above described wire applying device, baling wire can be applied to bales without the need of the usual spacing blocks, and without the necessity of an operator to feed the wires through the baling chamber. The operation is accomplished smoothly, rapidly, and in a practical and convenient manner. As the tying of the wires can be accomplished by the operator more rapidly than in conventional machines, the output of the machine is materially increased.

From the foregoing description it will be readily seen that there has been produced such a device as substantially fulfills the objects of the invention, as set forth herein.

While this specification sets forth in detail the present and preferred construction of the device, still in practice such deviations from such detail may be resorted to as do not form a departure from the spirit of the invention, as defined by the appended claims.

Having thus described the invention, the following is claimed as new and useful, and upon which Letters Patent are desired:

1. A wire applying device for a hay baling machine which includes a baling chamber having a reciprocating follower therein, said device comprising a frame extending laterally from the baling chamber, a carriage mounted for reciprocation on the frame in a direction transversely of the baling chamber, a needle extending from the carriage toward the baling chamber, the carriage and needle being normally outwardly retracted and spaced from the baling chamber, means to reciprocate the carriage so as to cause the needle to advance and project through the baling chamber and to retract and withdraw from said chamber, guide means on said opposite side of the baling chamber for a longitudinal wire, means arranged to cause engagement of said wire with the needle when the latter is in a full advanced position whereby subsequent retraction of the needle and point pulls the wire through the baling chamber and beyond said one side thereof, a shear arranged to sever the wire beyond said one side of the baling chamber, and means operative to cause actuation of the shear; said shear being of scissors type including separate legs, an upstanding rotary shaft, an arm radiating from the shaft, the shear being affixed to the arm by one leg, the shear normally being clear of the path of the wire but swingable to a wire severing position upon rotation of the shaft in a certain direction, and said last named means including a cam member mounted to engage the other leg and thus actuate the shears upon swinging thereof to said wire severing position.

2. A wire applying device, as in claim 1, including a mechanism actuated by the carriage, adjacent the end of its retracting motion, operative to rotate the shaft in said certain direction; such mechanism including a swing lever, a member on the carriage to engage and swing said lever, and an actuating linkage between the lever and shaft.

3. A wire applying device for a hay baling machine which includes a baling chamber having a reciprocating follower therein, said device comprising a normally outwardly retracted structure mounted beyond one side of the baling chamber for reciprocation transversely of the latter, a needle extending from the structure toward the baling chamber, means to reciprocate the structure so as to cause the needle to advance and project through the baling chamber and to retract and withdraw from said chamber, the needle having a wire pick-up point disposed beyond the opposite side of the baling chamber in a predetermined position when said needle is advanced and projecting through said baling chamber, guide means on said opposite side of the baling chamber for a longitudinal wire, means arranged to cause engagement of said wire with the wire pick-up point when the latter is in said predetermined position whereby subsequent retraction of the needle and point pulls the wire double through the baling chamber and beyond said one side thereof, with the runs of the wire spaced horizontally, and a wire separating finger unit mounted to separate the runs of the wire beyond said one side of the baling chamber; said unit including a finger engaged and raised by advance of the needle, and released and dropped between said runs upon retraction of the needle.

4. In a hay baling machine which includes a frame, a baling chamber mounted on the frame, a follower adapted to be reciprocated within the chamber and a wire threading needle unit adapted to be reciprocated transversely through the baling chamber; a means to operate the needle unit, such means comprising a rack mounted on the frame for movement longitudinally of the chamber, said chamber having a slot disposed in substantial parallelism with the rack, a leg outside the chamber and fixed to the portion of the follower exposed through said slot, manually operated latch means effective to selectively connect said leg in driving relation with the rack to reciprocate the same, driving connections interposed between the rack and the needle unit and operative to reciprocate the latter upon reciprocation of the rack, and means functioning automatically to effect release of the leg from said driving connection with the rack; said latch means including a block on the rack, a boss on the leg disposed in longitudinal alinement with the block, a latch hook pivoted on the frame above and in longitudinal alinement with the rack, means normally holding the latch hook clear of the block and boss, and manually operative means to release said holding means and allow the latch hook to drop into a position to engage the boss and hold it in a position adjacent the block; said latch hook holding means including a depending trigger on the latch hook, a lever arm pivoted on the frame below the rack, means yieldably acting on the arm to hold the latter in engagement with the trigger and maintain the latch hook in the position clear of the block and boss, and said manually operative means being effective to swing the lever arm clear of the trigger whereby to allow the latch hook to drop by gravity into the position for engagement with the boss.

5. A machine as in claim 4 in which said manually operative means includes a bell crank pivoted on the frame for swinging movement in a vertical plane, a link connecting one leg of the bell crank with the lever arm, and a pull rod connected with the other leg of the bell crank.

GEORGE JAY.

REFERENCES CITED

The following references are of record in the file of this patent:

UNITED STATES PATENTS

| Number | Name | Date |
|---|---|---|
| 787,008 | Taylor | Apr. 11, 1905 |
| 821,405 | Ellis | May 22, 1906 |
| 868,886 | Redpath | Oct. 22, 1907 |
| 1,085,085 | Hilliard | Jan. 20, 1914 |
| 1,241,548 | Peacock | Oct. 2, 1917 |
| 1,297,450 | Davis | Mar. 18, 1919 |
| 1,766,570 | Wallace | June 24, 1930 |

FOREIGN PATENTS

| Number | Country | Date |
|---|---|---|
| 112,771 | Australia | Mar. 19, 1941 |